US007127844B2

(12) United States Patent
Collins

(10) Patent No.: US 7,127,844 B2
(45) Date of Patent: Oct. 31, 2006

(54) REMINDER DISPLAY ENVELOPE

(75) Inventor: Robert William Collins, Shawnee, KS (US)

(73) Assignee: W & D Machinery Company, Inc., Overland Park, KS (US)

( * ) Notice: Subject to any disclaimer, the term of this patent is extended or adjusted under 35 U.S.C. 154(b) by 0 days.

(21) Appl. No.: 10/661,393

(22) Filed: Sep. 12, 2003

(65) Prior Publication Data

US 2005/0055854 A1 Mar. 17, 2005

(51) Int. Cl.
*G06F 1/00* (2006.01)

(52) U.S. Cl. ....................... 40/124.16; 40/751; 40/765; 40/789; 229/71; 229/75; 206/45.24

(58) Field of Classification Search ............. 40/124.16, 40/711, 721, 750, 751, 765, 788, 789; 229/71, 229/75, 68.1; 206/45.24
See application file for complete search history.

(56) References Cited

U.S. PATENT DOCUMENTS 1,421,097 A * 6/1922 Pente .......................... 40/754
1,979,917 A * 11/1934 Vaughn ....................... 229/72
2,386,618 A * 10/1945 Lisle ....................... 40/124.16
2,845,733 A * 8/1958 Fox ............................ 40/750
3,067,652 A * 12/1962 Cross ......................... 493/344
3,181,774 A * 5/1965 Littman ....................... 229/70
3,365,117 A * 1/1968 Powell, Jr. ................... 229/71
3,693,869 A * 9/1972 Eaves, Jr. ................... 229/302
4,167,241 A * 9/1979 Zumbrunn ................. 229/92.8
4,244,511 A 1/1981 Coleman
4,291,798 A * 9/1981 Transport ................ 206/45.24
4,294,400 A 10/1981 Gendron
4,433,780 A 2/1984 Ellis
4,911,354 A * 3/1990 Lombardo ................... 229/69
5,131,587 A * 7/1992 Staub ........................ 229/92.7
5,226,532 A 7/1993 Davidson et al.
5,236,121 A 8/1993 Wollman et al.
5,400,957 A 3/1995 Stude
5,439,101 A * 8/1995 Brink et al. ............. 206/45.24
5,487,566 A 1/1996 Hedge, Jr.
5,755,433 A * 5/1998 Klein ............................ 271/2
6,070,719 A 6/2000 Pollock
6,237,837 B1 * 5/2001 Martin ........................ 229/71
6,427,371 B1 8/2002 Olson et al. .................. 40/789

* cited by examiner

*Primary Examiner*—Gary C. Hoge
(74) *Attorney, Agent, or Firm*—Kenneth W. Iles

(57) ABSTRACT

A reminder card having a printed message is printed directly on the mailing envelope on the rear lower portion of the envelope and is perforated for easy removal. The reminder card is slipped into a window pocket on the front face of the envelope to display the reminder message. A base for forming the envelope into an upstanding display is formed by bending a flap on the bottom rear of the envelope upward into an arc and adhering the flap to a gummed flange formed from the outer edge of the sealing flap of the envelope to create a triangular shaped display capable of remaining upright. A magnetic strip glued to the envelope allows the envelope to be secured to a vertical ferrous surface.

11 Claims, 10 Drawing Sheets

REMINDER DISPLAY ENVELOPE

CROSS-REFERENCE TO RELATED APPLICATIONS

Not Applicable.

STATEMENT REGARDING FEDERALLY SPONSORED RESEARCH OR DEVELOPMENT

Not applicable.

BACKGROUND OF THE INVENTION

The present invention is related to an envelope for providing a reminder of an important date, event or the like. More particularly, the present invention is related to such an envelope that can be assembled into an upstanding permanent reminder display to be placed on a desk, table, shelf or the like to remind the recipient visually of the reminder notice.

DESCRIPTION OF THE RELATED ART INCLUDING INFORMATION DISCLOSED UNDER 37 C.F.R. 1.97 and 1.98

Members of the general public typically receive many pieces of unsolicited mail. While some of this mail is of interest to the recipient, much of it is not. Some of the mail is important to the recipient but need not be acted on immediately. The important mail is easily discarded inadvertently or placed in a pile of similar mail and forgotten, perhaps leading to missed deadlines. For example, a subscription notice may be easily overlooked and late payment made, leading to missed issues of an important magazine or journal or worse.

Many types of notices have been used for billing, including, for example, printing notices on the outside of the mailing envelope such as "last issue," "billing statement," "reminder notice" and the like. These notices may bring the recipient's attention to them, but present only the typical flat display that as likely as not will end up in the trash or in a flat stack of envelopes that the recipient hopes to address later, but sometimes does not. Nor do such envelope notices invite the recipient to take any action other than to open the envelope and follow the instructions inside. Often it is likely that the envelope is not opened promptly and in this case, the notice has failed.

An example of an envelope designed to provide an easy storage place for coupons and the like is disclosed in U.S. Pat. No. 5,487,566, which includes a non-sealable storage envelope with a number of coupons attached to it where a regular closure flap would normally be found. A user can detach the desired coupons and store them in the envelope, which remains flat and holds a number of perhaps unrelated articles. While some user action is required to utilize this envelope, once the informational material is placed inside the envelope, there is nothing to remind the user of any of the contents, which are easily forgotten.

A handy reusable envelope is disclosed in U.S. Pat. No. 5,400,957, which is convenient for paying bills utilizing the same envelope that the bill arrived in. While this envelope engages the user further than a normal simple return envelope often included with bills, in itself it does nothing to remind the recipient of any needed action.

It is also known to provide a three dimensional upright display made from a mailer or envelope to display a photograph, greeting card or the like after receipt. These types of displays are disclosed, for example, in U.S. Pat. No. 6,427,371, issued to Olson et al., which, when folded, provides a display having a flat base with two angled sides, a front and rear, meeting to form a triangular display. While the user must fold the mailer to form the display, he is not engaged in any way regarding any reminder function, even if a reminder were to be presented on the display panel.

A similar shaped display for holding an audio cassette and a message card is disclosed in U.S. Pat. No. 4,433,780, issued to Ellis, and has the same utility limitations noted in connection with Olson et al.

Another mailer that can be unfolded to provide an upright display is disclosed in U.S. Pat. No. 3,174,244, issued to Walton, which can be unfolded by the recipient to form a flat panel, which can be stood on edge by bending at the folds so that the bottom edge is not straight, but is angled at the folds. This mailer too could be used to provide a reminder message, but would requires no action by the recipient to place the reminder on the display, thereby decreasing the likelihood that the mailer would be used as a reminder display.

Further, each of the mailers described above are relatively expensive to manufacture and to mail, being heavy, and therefore are not suitable for mass mailing where the response rate is typically very low. Further these devices cannot readily be manufactured on conventional envelope manufacturing equipment and requires relatively complex set up requirements.

Therefore, a need exists for an envelope that requires some conscious intentional action by the recipient both to make note of the reminder and to form the display; that provides a permanent handy upright visual display of the reminder; that is easy and inexpensive to manufacture and that can be manufactured on conventional envelope manufacturing equipment with minimal setup requirements.

BRIEF SUMMARY OF THE INVENTION

Accordingly, it is a primary object of the present invention to provide an envelope that can be used by the recipient as a convenient reminder of a date or the like.

It is a further object of the invention to provide an envelope that requires some conscious intentional action by the recipient both to make note of the reminder and to form the display.

It is a further object of the invention to provide an envelope that provides a permanent handy upright visual display of the reminder.

It is a further object of the invention to provide an envelope that is easy and inexpensive to manufacture and that can be manufactured on conventional envelope manufacturing equipment with minimal setup requirements.

The reminder display envelope is formed from a folded flat pattern with sealed flap seams and, in a preferred embodiment, includes a mailing address window, which is covered with a transparent material such as a glassine sheet or the like glued to the inside surface of the envelope or may be only an opening cut into the paper. Along the bottom score line of the assembled envelope lies a perforated portion with a message printed on it. The recipient opens the envelope in the conventional fashion, allowing him access to the mailing address window from inside the envelope. A frame is formed along the window by sealing the transparent window along a perimeter that is somewhat larger than the perimeter of the window opening itself, forming a pocket on the inside of the mailing address window. The recipient removes the reminder message from the bottom rear edge of the envelope and inserts it into the pocket.

Then the recipient pulls up a large perforated flap formed into the rear surface of the mailing envelope, forms a perpendicular bend in the a bottom flap and sticks the upwardly bent large perforated flap to the bottom flap using the adhesive layer coated onto the bottom flap, thereby forming a reminder display having a flat base and a display surface including the reminder notice. The assembled display includes a roughly triangular end, which is basically uniform along the length of the display.

In another embodiment, a display, such as a calendar, which may have special dates noted, such as a baseball game schedule, school days schedule or the like, is printed on one side of exterior of the envelope and a pocket formed on the same surface allows the recipient to display a photograph of choice, such as a photograph of a child or a baseball card. This display reminds the recipient of a special day or days and of a person or the like. The display pocket is preferably integrated into the layout of the calendar and can be placed at any desired location on the reminder display envelope.

A reminder display envelope according to the present invention reinforces the message in the mailing. When the recipient removes the reminder notice from the envelope, places it into the reminder display pocket and then folds the envelope into the assembled display state, he is reminded at every step of the information in the reminder notice, reinforcing the date, event or the like noted on the reminder card. By actively engaging the recipient so extensively, utilizing the reminder display window envelope of the present invention will help the recipient retain the important information in the reminder notice and having a permanent display at his desk, table or the like will provide a constant reminder of the information noted on the reminder card. Engaging the recipient to this extent in the handling of his mail improves the likelihood that the information on the reminder card will be acted upon in a timely manner.

Other objects and advantages of the present invention will become apparent from the following description taken in connection with the accompanying drawings, wherein is set forth by way of illustration and example, the preferred embodiment of the present invention and the best mode currently known to the inventor for carrying out his invention.

DETAILED DESCRIPTION OF THE INVENTION

Figure 1:
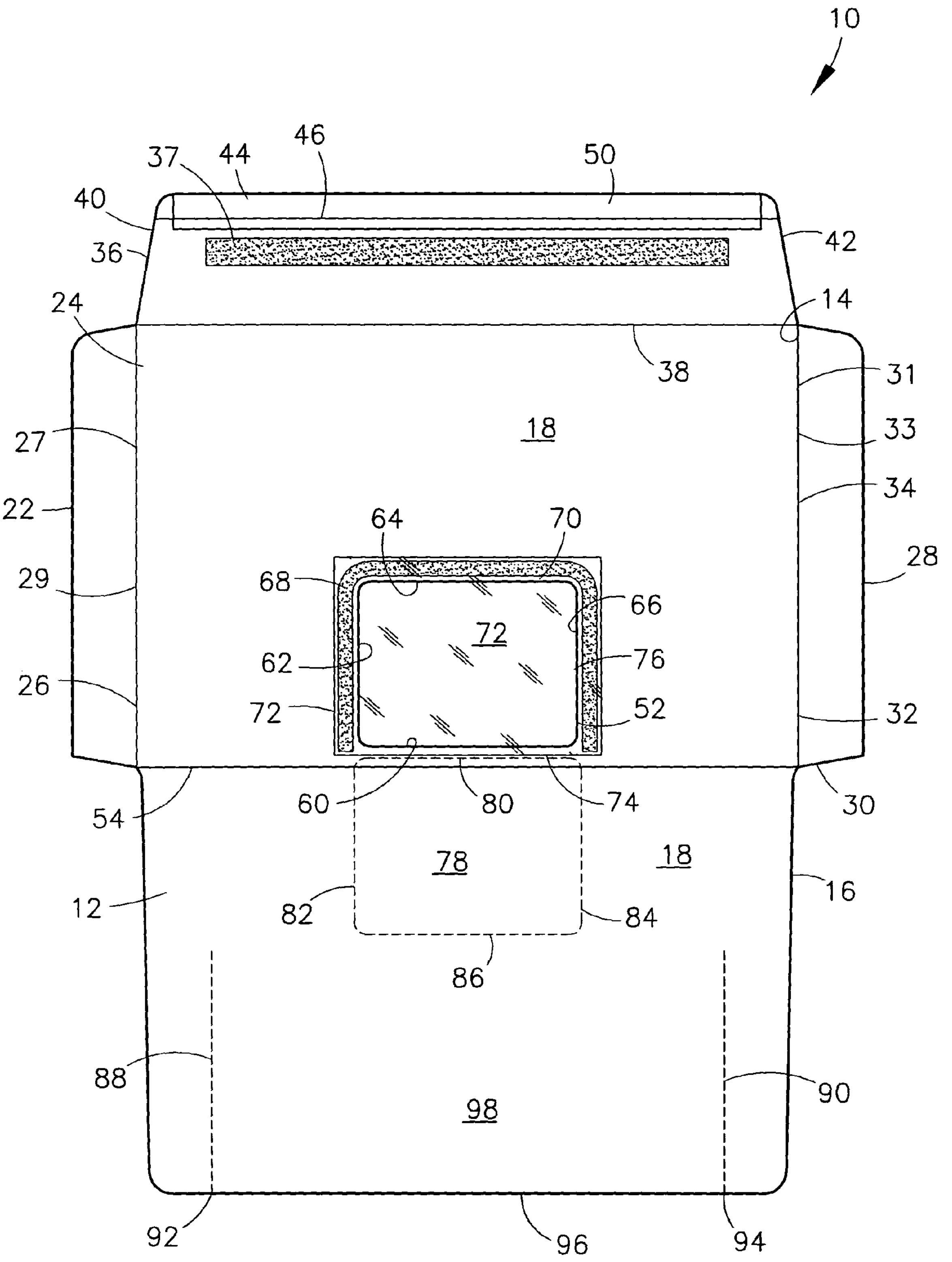
FIG. 1 is a flat pattern of a preferred embodiment of a reminder display envelope according to the present invention.

Referring to FIG. 1, a reminder display envelope (reminder envelope) 10 according to the present invention comprises a flat pattern blank 12 preferably made principally from paper, with the flat pattern blank 12 being preferably formed from a web of any material or a single sheet of material suitable for making envelopes. Right-hand, left-hand, up, down, top, bottom an so forth have their normal meanings, but are applied to the figure being discussed as it appears on the page, which do not necessarily, and certainly not in the case of FIG. 1, indicate the corresponding directions on the finished, or folded reminder envelope 10. The flat pattern blank 12 includes a front panel 14 and a rear panel 16, with the interior surface 18 of the display envelope 10 of the front panel 14 and the rear panel 16 being the visible surface or top surface as the flat pattern blank 12 is shown in FIG. 1. The opposite face of the interior surface 18 is the exterior surface 20, for example FIGS. 2, 3. The flat pattern blank 12 further includes a left-hand side flap 22 connected to and contiguous with the left-hand side 24, with a left-hand flap score line 26 defining the inner edge 27 of the left-hand side flap 22 and the outer left-hand edge 29 of the front panel 14. A right-hand side flap 28 having a right-hand flap score line 31 defining the inner edge 33 of the right-hand side flap 28 is connected to and contiguous with the right-hand side 30 of the front panel 14, with the score line 32 defining the outer right-hand edge 34 of the front panel 14 and the inner edge 34 of the right-hand side flap 28.

Still referring to FIG. 1, a seal flap 36 along the seal flap score line 38, of the front panel 14 includes a left-hand edge 40 and a right-hand edge 42, which are both angled inward toward a vertical center line of the flat pattern blank 12, and a top edge 44. A secondary score line 46 runs across the width of the seal flap 36 and adjacent to, parallel to and somewhat down from the top edge 44. The seal flap 36, which is coated with a releasable adhesive layer 37, will be folded along the secondary score line 46 to form base for the display unit state, as discussed below. An adhesive layer 48 (FIG. 6) is coated onto the area adjacent to the secondary score line 46 and somewhat below it and extends upwardly to the top edge 44 of the seal flap 36. The adhesive layer 48 is covered with a peel away release strip 50, which covers the entire adhesive layer 48, but which is shown peeled back at the right-hand side to reveal the adhesive layer 48 for illustration. During assembly, all or a portion of the area between the silicone or other suitable release strip 50 and the seal flap score line 38 is coated with an adhesive, which may be a gummed adhesive activated by moisture, preferably the dextrine adhesive strip 37. This adhesive is used for sealing the completed reminder envelope 10 and contents for mailing. The area under the release strip 50 will not be sealed against the completed and sealed reminder envelope 10, leaving a small flap free for the recipient to grasp when opening the reminder envelope 10, and the adhesive used for sealing the completed reminder envelope 10 is a moderately aggressive adhesive that allows the seal flap 36 to securely seal the contents into the reminder envelope 10, while allowing the recipient to unseal the seal flap 36 and open the reminder envelope 10 without tearing any portion of the sealing envelope 10.

Still Referring to FIG. 1, an address window 52 is cut into the front panel 14, which is adjacent to the bottom flap score line 54. The address can be printed on the enclosed mailing material and will show through the address window 52. The address window is defined by the bottom window edge 60, the left-hand edge 62, a top edge 64 and a right-hand edge 66, which form a rectangular, square or other suitably shaped address window 52, which is preferably horizontally centered along the vertical center line of the flat pattern blank 12 and is vertically located above and adjacent to the bottom flap score line 54. An adhesive layer 68 is applied to a band adjacent to three sides of the perimeter of the address window 52, that is, to the right-hand edge 62, the top edge 64 and the right-hand edge 66 of the address window 52, to form a U-shaped gumming layer, which is spaced away from the edges of the address window 52 by a short distance, such as 2 mm, providing an ungummed window margin 70. A thin transparent address panel 72, made from glassine or the like, is cut to fit the area defined by the adhesive layer 68 and the address window 52 and preferably a little larger area to insure that the entire address window 52 and adhesive layer 68 are covered by the thin transparent address panel. This leaves the bottom edge 74 of the thin transparent address panel unsealed and not attached to the flat pattern blank 12 at all, thereby forming a reminder pocket 76 defined by the thin transparent address panel having three sides fixed to the flat pattern blank 12, for insertion of the reminder card 78.

Figure 3:
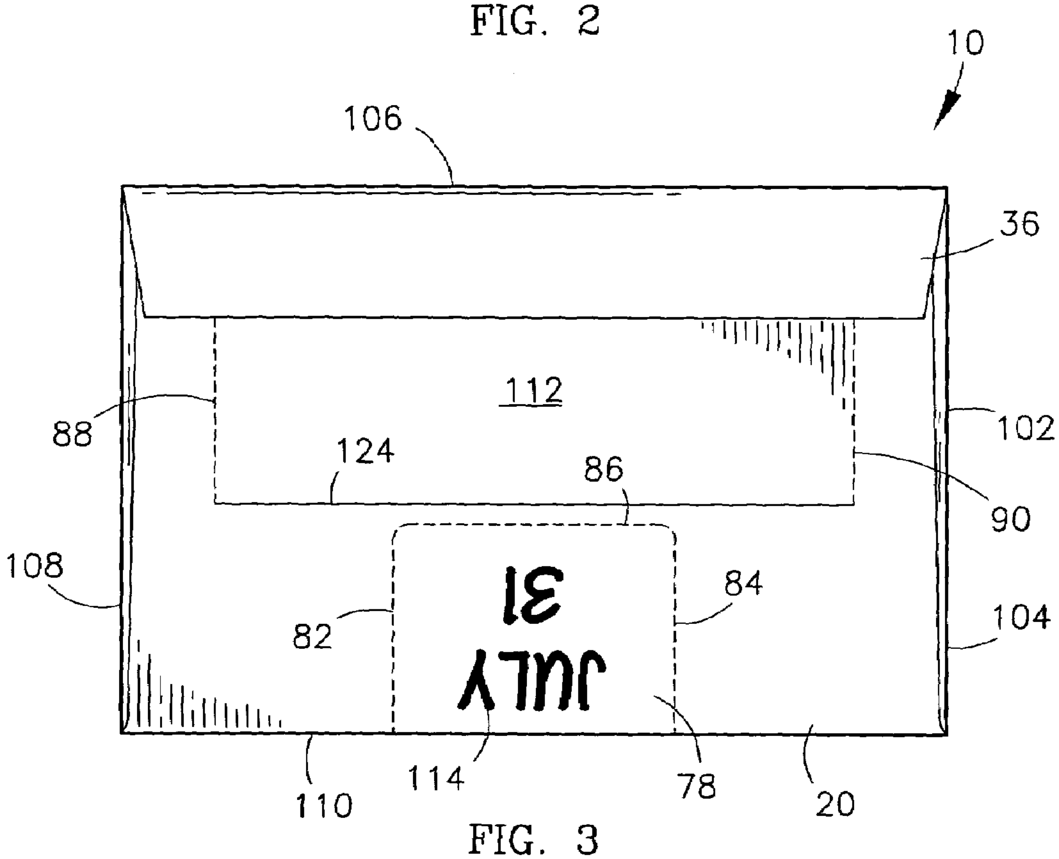
FIG. 3 is a rear view of the reminder display envelope of FIG. 1 showing the rear face of the envelope when it is in its assembled state ready for mailing.
Figure 5:
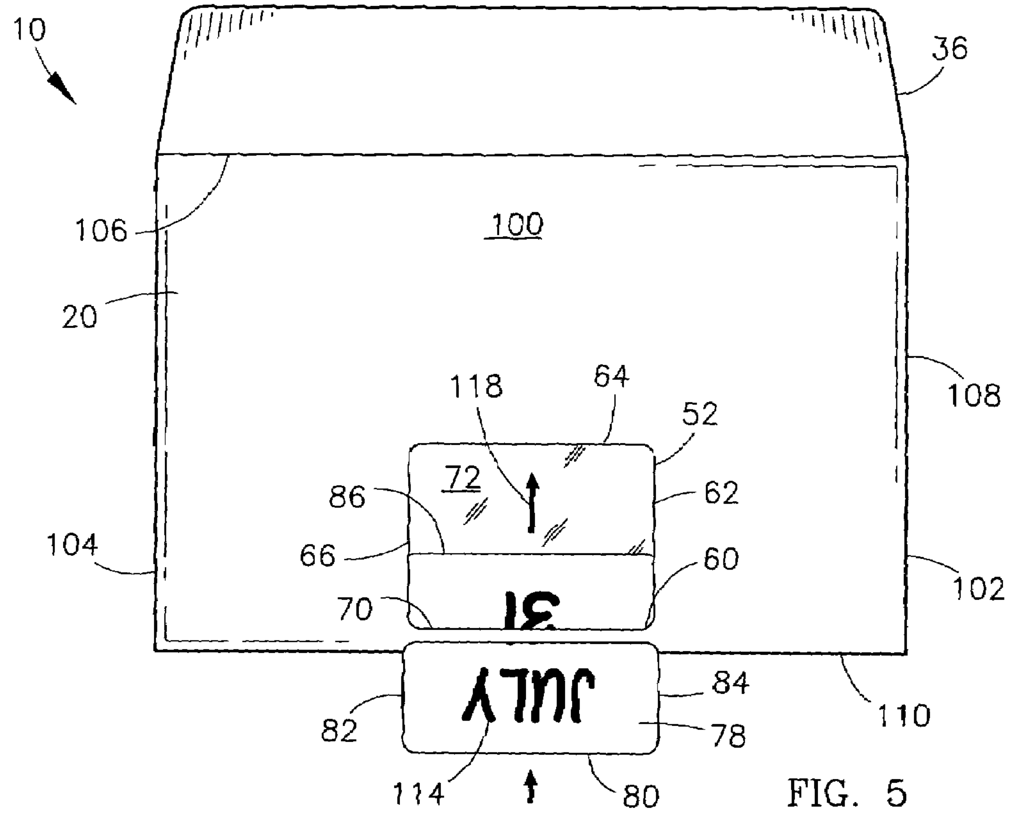
FIG. 5 is a rear view of the reminder display envelope of FIG. 1 showing the reminder notice being inserted into the display pocket.

Still referring to FIG. 1, the rear panel 16 includes the reminder card 78, which is a square or other suitable shape defined by the four perforated edges, including the top edge, or top perforation line, 80, which lies slightly above and adjacent to the bottom flap score line 54 and within the front panel 14, and spaced parallel coterminous left-hand side edge, or left-hand side perforation line, 82 and right-hand side edge, or right-hand side perforation line, 84, both of which have a small portion in the front panel 14, and a bottom edge, or bottom perforation line 86. The reminder card 78 is easily separated from the reminder envelope 10 and the reminder card 78 is easily inserted into the reminder pocket 76 through the bottom edge 60 of the address window 52 to display a reminder message because the reminder card 78 is the same size as the reminder pocket 76 or slightly smaller. The bottom edge 86 of the reminder card 78 becomes the top edge of the reminder card 78 after it is removed from the reminder envelope 10 and inserted into the reminder pocket 76 (FIG. 5). The reminder message can be printed on the interior surface 18 on the reminder card 78 or on the exterior surface 20, as shown in FIG. 3, where it is visible to the recipient prior to opening the reminder envelope 10.

Still referring to FIG. 1, the rear panel 16 also includes a pair of spaced parallel perforation lines, including the left-hand perforation line 88 and the right-hand peroration line 90, each having a lower end 92, 94 respectively that intersects the bottom edge 96 of the flat pattern blank 12 and extending upwardly to a point below but close to the horizontal line abbreviated by the bottom edge 86 of the reminder card 78, which is about 40%–70% of the distance from the bottom edge 96 to the bottom flap score line 54, with the preferred length being about 60% of the distance between the bottom edge 96 and the bottom flap score line 54. Tearing these perforation lines 88, 90 along their entire lengths will form a display supporting panel 98, as described in greater detail below. The address window 52 and the reminder card 78 are shown in their preferred locations on the flat pattern blank 12, but could be placed anywhere on the reminder envelope 10.

Still referring to FIG. 1, the placement of the address window 52 results in the reminder card 78 being at the top and center of the display envelope 10 when it is assembled into the display position, which is deemed to be the most prominent position of the reminder card 78. Further, placement of the reminder card adjacent to the bottom edge 110 of the completed mailed reminder envelope minimizes the distance that the recipient must move the reminder card 78 to insert it into the reminder pocket 76. Further the relative placement of the reminder card 78 and the reminder pocket 76 suggests to the recipient the mechanism of sliding the reminder card 78 directly upward into the reminder pocket 76.

Still Referring to FIG. 1, in order to construct an envelope from the flat pattern blank 12, the left-hand side flap 22 and the right-hand side flap 28 are folded along the score lines 26, 32, respectively and the exterior surfaces 20 of the flaps 22, 28 are coated with an adhesive. Then the rear panel 16 is folded upwardly along the bottom flap score line 54 and stuck to the side flaps 22, 28. This construction hides the left-hand side flap 22 and the right-hand side flap 28 behind the rear panel 16 in the completed reminder envelope 10. Alternatively, the rear panel 16 may be folded upwardly and then the side flaps 22, 28 can be folded against the rear panel 16, with adhesive coated onto the interior surface 18 of the side flaps 22, 28. After the reminder envelope 10 is formed into an envelope, the desired contents are then placed into the reminder envelope 10 so that the mailing address is visible through the address window 52 and the seal flap 36 is folded downwardly along the top edge of the sealing flap score line 38 and adhered to the exterior surface 20 of the rear panel 16 along and adjacent to the bottom edge 96 of the flat pattern blank 12.

Figure 2:
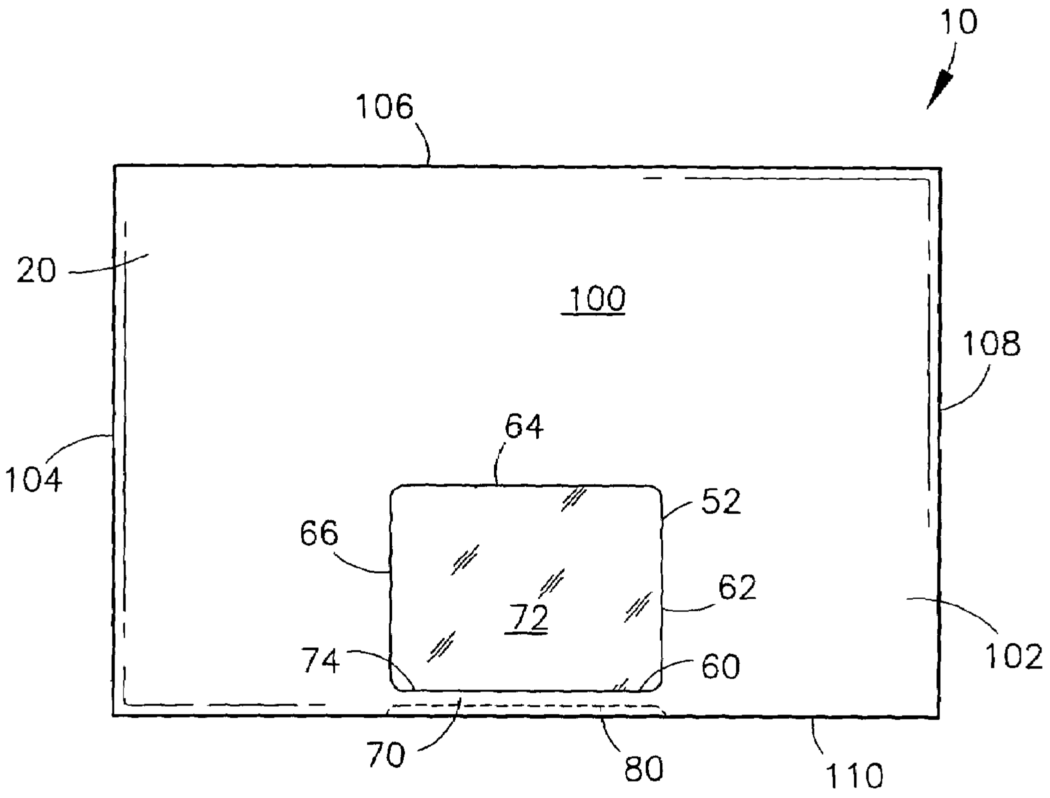
FIG. 2 is a front view of the reminder display envelope of FIG. 1 showing the front face of the envelope when it is in its assembled state ready for mailing.

Referring to FIG. 2, the front face 100 of the completed and sealed envelope 102 includes a left-hand side edge 104, a top edge 106, a right-hand side edge 108 and a bottom edge 110.

Referring to FIG. 3, the rear face 112 of the completed envelope 102 includes the printed reminder notice message 114, "July 31," reminding the recipient of a date, event, or the like, which is printed on the exterior surface 20 in the perforated reminder card 78. The reminder notice 114 is printed upside down relative to the completed envelope 102 having its top edge 106 up so that, as the reminder card 78 is removed by tearing along the perforations 80, 82, 84 and 86 and is slid from the rear face 112 of the completed envelope 102 to the front face 100 of the completed envelope 102, the reminder notice message 114 will be aligned with the reminder pocket 76 and positioned so that when the reminder card 78 is inserted into the reminder pocket 76, the reminder notice message 114 will be visible through the address window 52 and will be right-side up when the bottom edge 110 of the completed envelope 102 is at the top of the reminder display. Alternatively, the reminder message notice could be printed right-side up relative to FIG. 3, or could be printed on the interior surface 18 of the flat pattern blank 12 prior to forming it into the completed envelope 102. The left-hand side 104 and the right-hand side 108 are switched from one side to the other relative to FIG. 2 because the completed envelope 102 has been rotated 180° from FIG. 2 to FIG. 3 and the terms left-hand side, right-hand, top edge and bottom edge are all defined from viewing the completed envelope 102 in FIG. 2.

Figure 4:
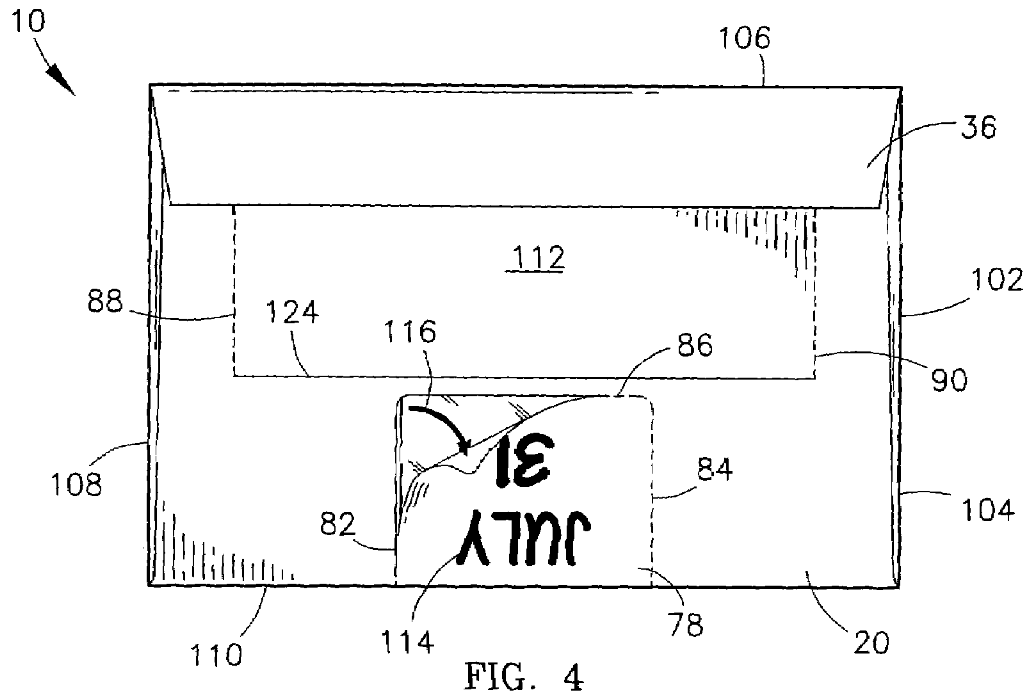
FIG. 4 is rear view of the reminder display envelope of FIG. 1 showing the process of removing a reminder notice.

Referring to FIG. 4, the reminder card 78 is removed from the rear face 112 of the completed envelope 102 by tearing along the perforated edges 80, 82, 83 and 84 in the direction of the arrow 116 to peel the reminder card off of the completed envelope 102.

Referring to FIG. 5, the now removed reminder card 78 is slipped into the reminder pocket 76 along the general direction of the arrow 118, where the reminder notice message 114 is visible through the address window 52 and upside down relative to the top edge 106 of the completed envelope 102, which will become the top edge of the upstanding display 107 (e.g., FIGS. 7, 8) described below, which will place the reminder notice message 114 in a right-side up position for convenient reading by the recipient.

Figure 6:
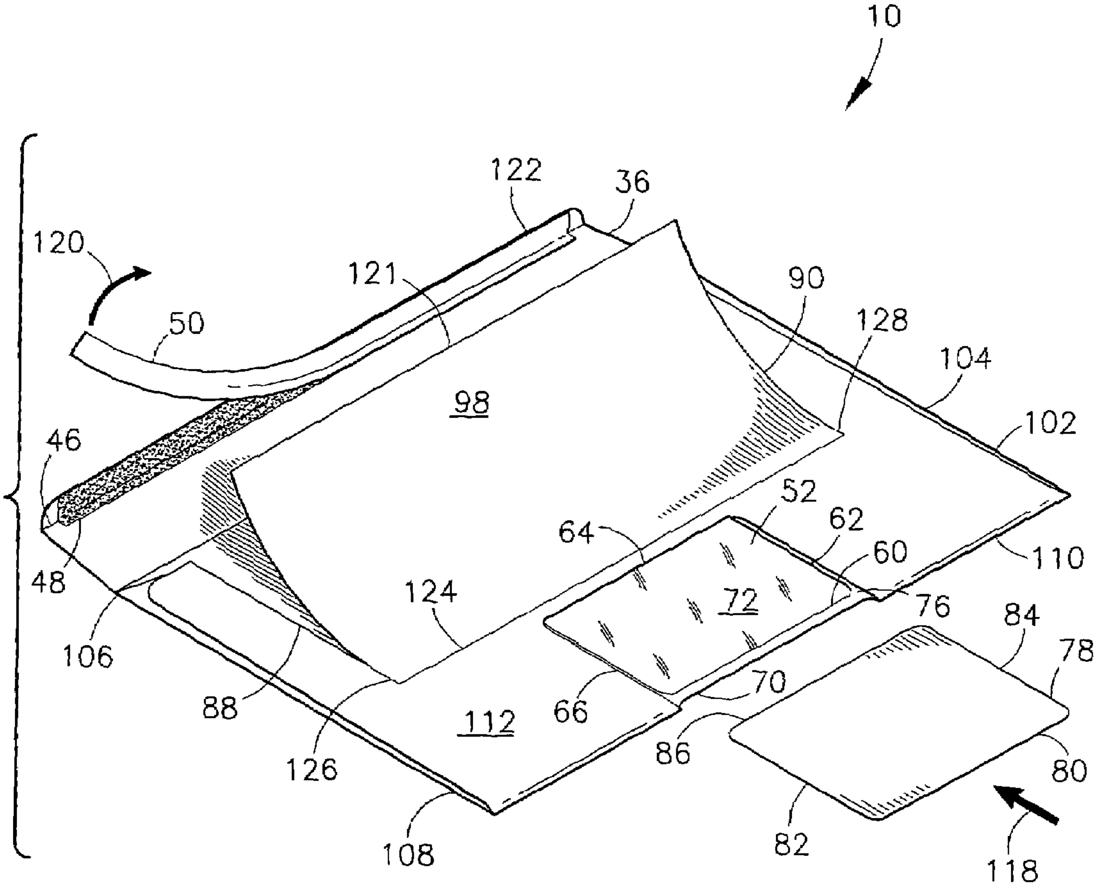
FIG. 6 is an isometric view of the rear of the reminder display envelope of FIG. 1 showing the reminder notice being inserted into the display pocket and showing the formation of a base that allows the envelope of FIG. 1 to be stood up to provide an upright reminder display.

Referring to FIG. 6, the reminder card 78 is again shown being inserted into the reminder pocket 76 along the direction of the arrow 118. A base for providing an upstanding display 107 is formed by first tearing along the perforated lines 88, 90 and peeling up the resulting display supporting panel 98, forming a lower edge 121 on the display supporting panel 98. The display supporting panel 98 is then preferably creased sharply along the printed fold line 124 by folding the lower edge 121 toward the bottom edge of the completed envelope 102 and creasing the line from the upper end 126 of the left-hand side perforation line 88 to the upper end 128 of the right-hand side perforation line 90. The line between these two points may be printed on the reminder envelope 10 or left to the eye of the recipient. The top edge 44 of the seal flap will become the upper edge of a flange 122 to form the base 30 of the upstanding display 107, described in more detail below in connection with FIGS. 15, 16.

Still Referring to FIG. 6, then the upper portion of the seal flap 36 is bent upwardly at a 90° angle along the secondary score line 46 forming an upstanding flange 122. Then the peel away release strip 50 is peeled away as indicated by the arrow 120 to expose the adhesive layer 48. The order of the two preceding steps may be reversed without jeopardizing the erection of the display, but it is easier to form the flange 122 before the adhesive layer 48 is exposed and this sequence preserves the strength of the adhesive because no skin oils will come into contact with the adhesive layer 48. The thin transparent panel 72 that covers the address window 52 and forms the reminder pocket 76 is visible because the reminder card 78 has been removed from the reminder envelope 10 and the contents of the reminder envelope 10 (not shown) have been removed.

Figure 7:
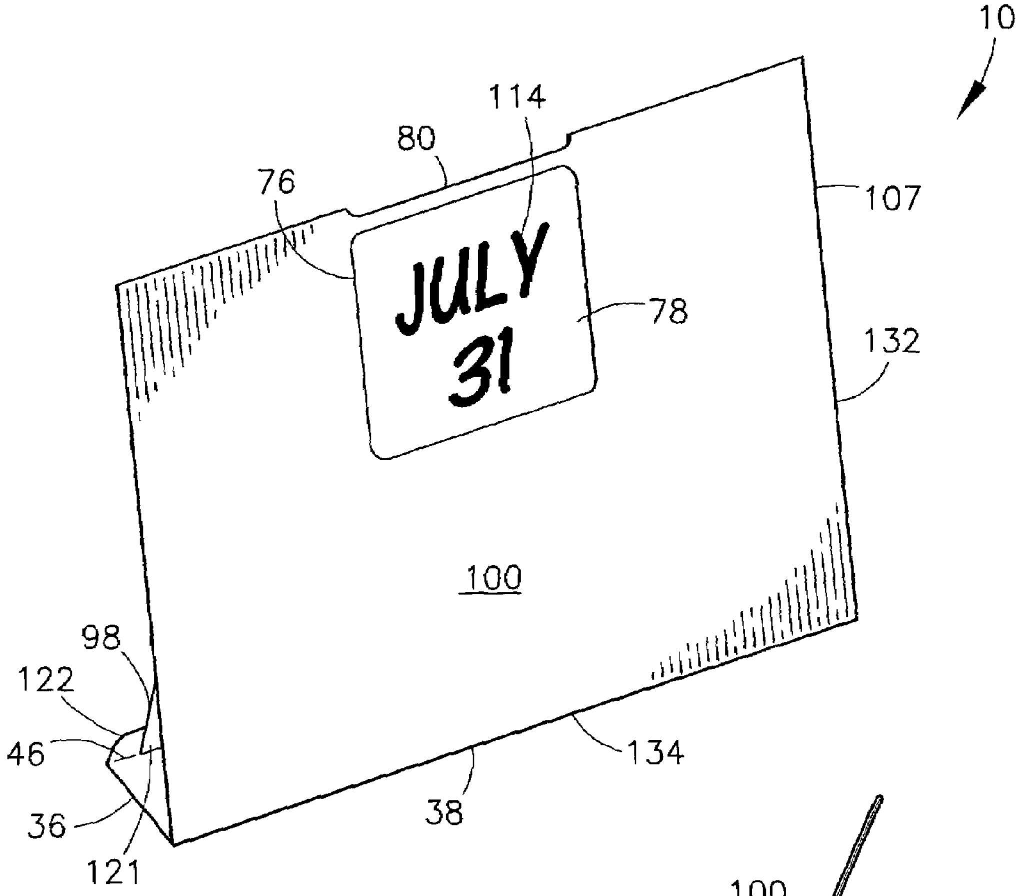
FIG. 7 is an isometric view of the reminder display envelope of FIG. 1 showing the envelope set up into a reminder display for displaying the reminder notice inserted into the display pocket of the envelope.
Figure 8:
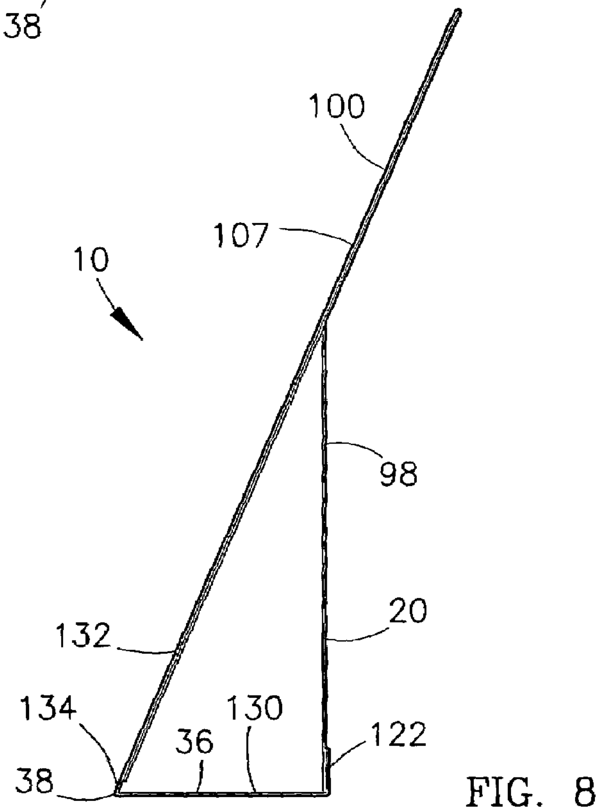
FIG. 8 is a side view of the display of the reminder display envelope as shown in FIG. 7.

Referring to FIGS. 7, 8, the upstanding flange 122 formed in FIG. 6 is adhered to the lower edge 121 along the exterior surface 20 of the lower edge 121, forming a triangular shaped end view structure best seen in FIG. 8, in which the seal flap 36 (except the flange portion 122) forms a flat base 130 that can be set down on any horizontal surface, which is connected to the front face 100 of the reminder envelope 10, which leans back at an angle of about 10° to 30° from the vertical, with the preferred angle being about 20°. The top edge of the resulting reminder display panel 132 is further from a viewer directly in front of it that the lower edge of the reminder display, that is, the reminder display is tilted backward. The reminder display panel 132 (the front face 100 of the completed envelope 102) displays the reminder card 78 and the printed reminder notice message 114 on the reminder card 78 in the completed display illustrated in FIGS. 7, 8. The display supporting panel 98 forms a supporting vertical back member that maintains the reminder display 132 in an upright position for display and to provide a permanent reminder of the event or date noticed on the reminder card 78. In the completed reminder display 132, the seal flap score line 38 of the front panel 14 (FIG. 1) forms the bottom edge 134 because the reminder envelope 10 is turned upside down when it is converted from the completed envelope 102 to the reminder display 132.

Figure 9:
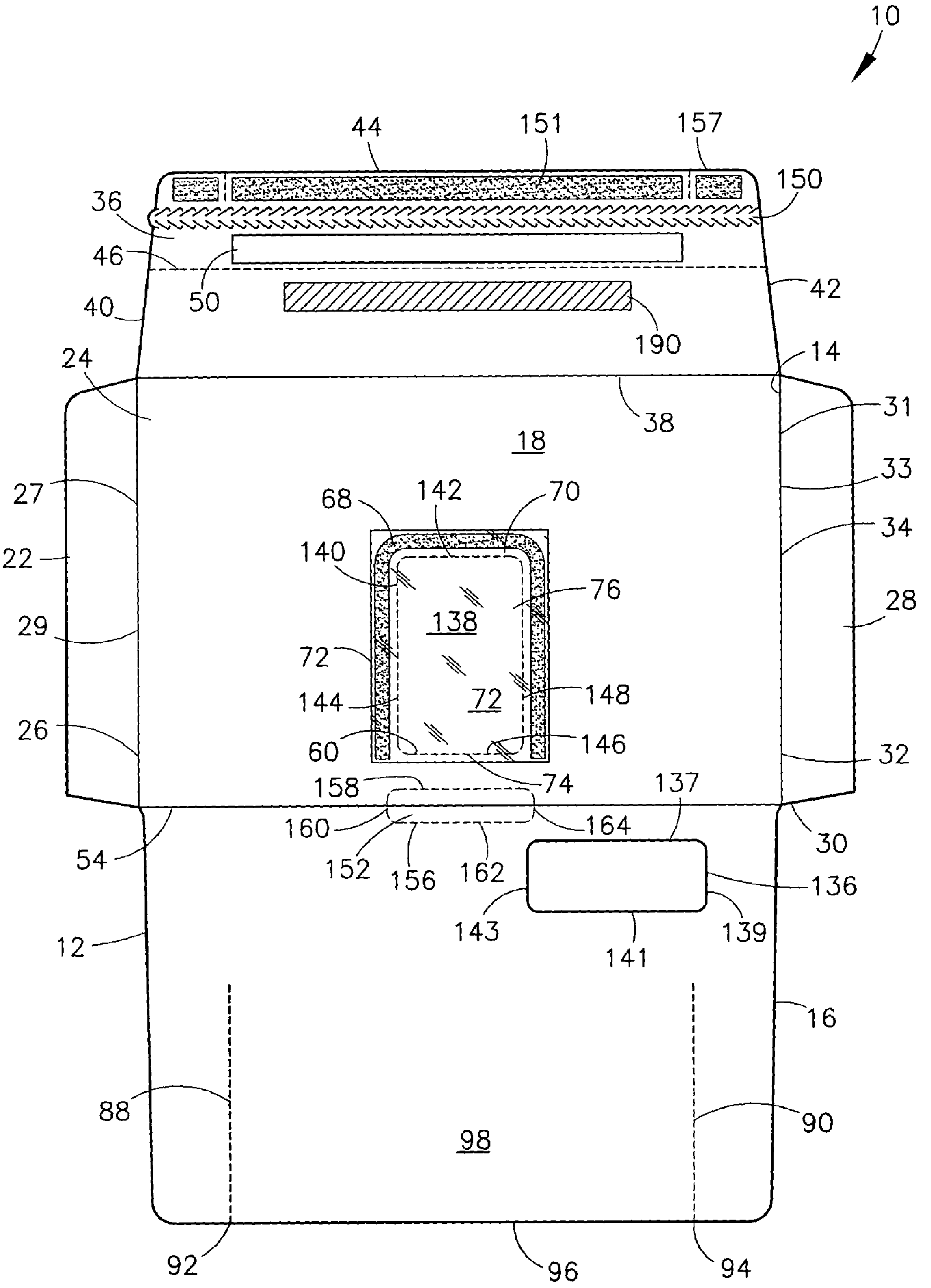
FIG. 9 is a flat pattern view of an alternative embodiment of a reminder display envelope according to the present invention.

Referring to FIG. 9, a cut out address window 136, defined by the top address window line 137, the right-hand side address window line 139, the bottom address window line 141 and the left-hand side address window line, which are arranged to form a rectangular address window 136 or other conveniently shaped address window, is conveniently located in the rear panel 16 adjacent to and below the bottom flap score line 54, but can be located at any convenient place on the rear panel 16 and may be either a simple cut out window as shown or may be covered by a glassine sheet or the like. The delivery address will be visible through the address window 136 for shipping. A display window cover 138 is easily removed from the reminder display envelope 10 by tearing along the perimeter 140, which is defined by a top perforation line 142, a left-hand side perforation line 144, a bottom perforation line 146 and a right-hand side perforation line 148.

Still referring to FIG. 9, a perforated pull tab zipper 150 lies across the width of the seal flap 36 between the layer of sealing adhesive 151, which lies adjacent to the top edge of the seal flap 36, preferably dextrine, for sealing the reminder display envelope 10 and the adhesive layer 48, covered by the release strip 50, which is utilized for setting up the completed display. In this embodiment, the portion of the seal flap 36 above the pull tab zipper 150 remains attached to the reminder display envelope 10 after it is opened.

Figure 10:
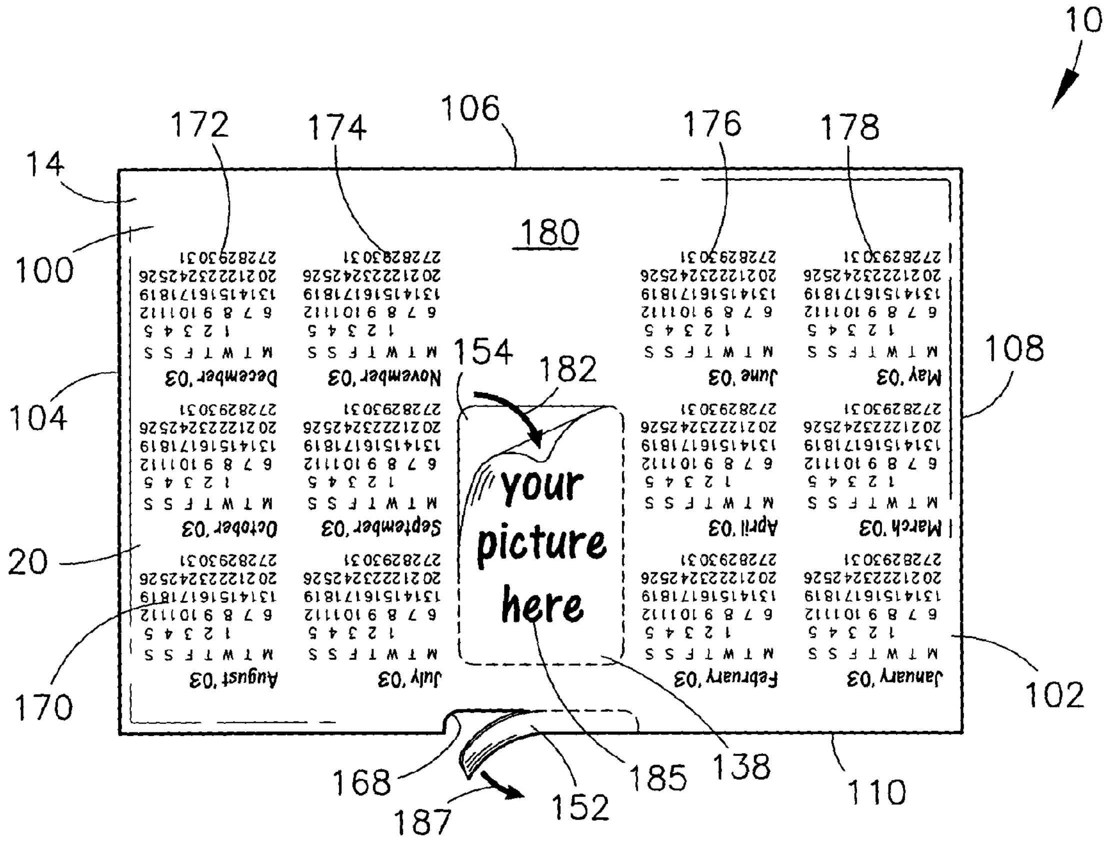
FIG. 10 is a front view of the reminder display envelope of FIG. 9 showing the front face of the envelope when it is in its assembled state ready for mailing and illustrating the removal of a display window cover.
Figure 11:
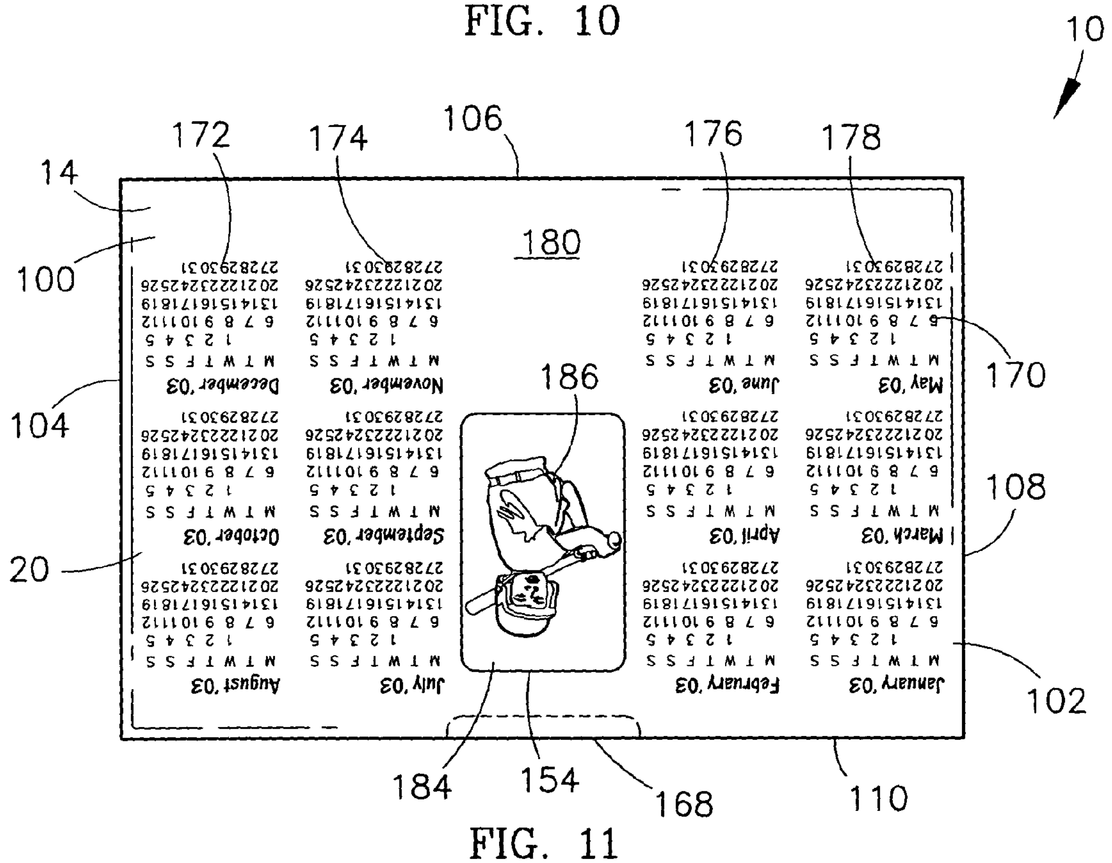
FIG. 11 is the front view of the reminder display envelope of FIG. 9 illustrating the reminder display in the display window.

Still referring to FIG. 9, an envelope access panel 152 is a portion of the reminder display envelope 10 that, when removed, allows the recipient access to the interior of the completed reminder display envelope 10 to retrieve reminder cards that will be displayed in the reminder window 154 (e.g., FIGS. 10, 11). The envelope access panel 152 must therefore have a width at least as wide as the reminder card 78 and is most conveniently located in a position with the width of the envelope access panel 152 aligned with the width of the display window 154. In particular, the envelope access panel 152 is defined by an access panel perimeter 156 consisting of an upper access panel perforation line 158, a left-hand side access panel perforation line 160, a bottom access panel perforation line 162 and a right-hand access panel perforation line 164. The left-hand side access panel perforation line 160 and the left-hand side display window perforation line 144 lie on the same line. The right-hand side access panel perforation line 164 and the right-hand side display window perforation line 148 lie along the same line. The distance between the upper access panel perforation line 158 and the bottom access panel perforation line 162 is bisected by the bottom flap score line 54. Tearing the perforation lines along the access panel perimeter 156 allows removal of the access envelope panel cover 152, which reveals the access slot 168 (e.g., FIGS. 10, 11).

Referring to FIG. 10, an information display such as the calendar 170 is printed on the front face 100 of the reminder display envelope 10. The calendar 170 can highlight certain important dates, such as birthdays, dates of sporting events, holidays and the like by printing a date in bold face, enclosing it in a red circle, a starburst pattern or the like. The calendar 170 is portrayed arranged in four columns 172, 174, 176, 178, with the display window 154 being located in the relatively large space 180 between columns 174, 176. The material presented on the front face 100 may be any desired material, including, for example, a calendar arrayed in any desired layout or may consist of any desired informational display. The display window 154 may be placed in any desired location on either face of the reminder display envelope 10, but is preferably aligned with the access slot 168, as described elsewhere. The display window cover 138 is conveniently peeled away from the envelope by tearing in the direction of the arrow 182 or other direction to reveal the display card 184 (FIG. 11). The exterior surface of the display window cover 138 is printed with the instructions 185, which states "your picture here," or other material, for example instructions for using the display window 154. At the same time, the access slot 168 is revealed by peeling away the envelope access panel 152 by tearing in the direction of the arrow 187 as shown or along another convenient direction.

Referring to FIG. 11, the display card 184 is preferably the photograph 186 of a favored person, for example, one of a group of photographs taken at a studio. The display card may be a baseball trading card, football trading cards, or the like, with all team members' cards inside the reminder display envelope 10. The display cards 184 may be printed with messages, such as inspirational messages, poems, cartoons or the like. The recipient can select which display card 184 is displayed in the display window 154, as discussed in greater detail below. The display card 184 is a type of reminder card 78, which has been differently named and numbered here to distinguish the content of the cards more clearly and not because these are fundamentally different elements.

Figure 12:
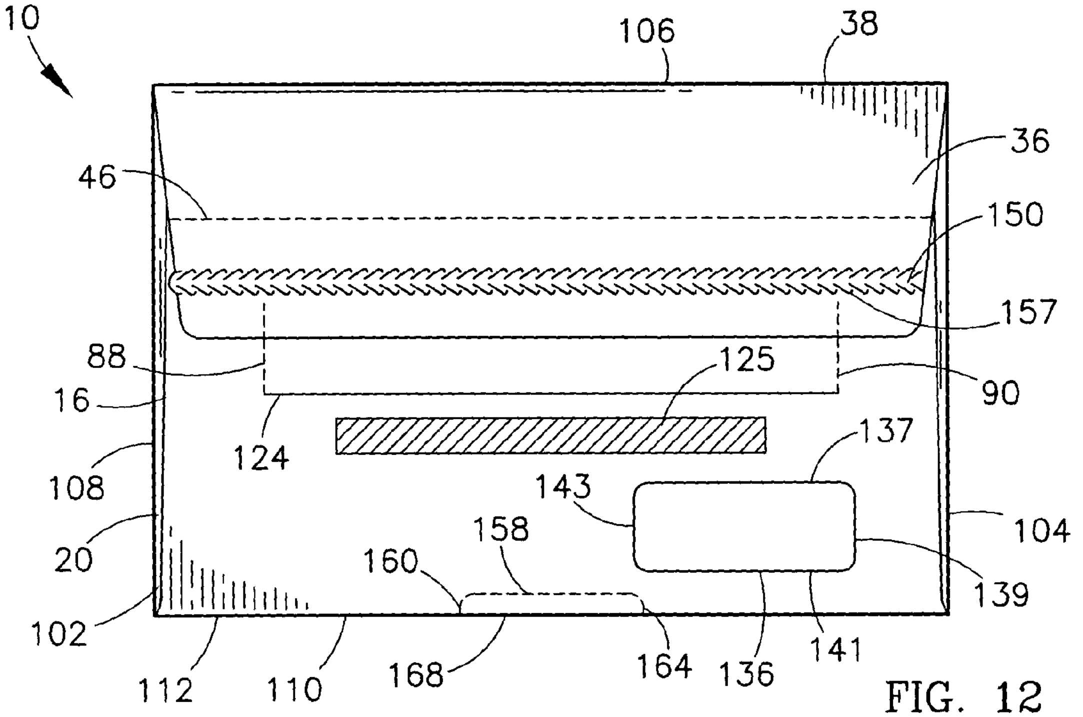
FIG. 12 is a rear view of the reminder display envelope of FIG. 9 showing the rear face of the envelope when it is in its assembled state ready for mailing and showing the location of the address window on the rear face.

Referring to FIG. 12, the rear face 112 of the completed and sealed reminder display envelope 102 includes the address window 136 and the perforated pull tab zipper 150, as well as the left-hand side perforation line 88, the right-hand side perforation line 90 and the printed fold line 124, all for constructing the base 130 as described above.

Still referring to FIG. 12, a rectangular thin magnetic strip 125 is glued to the rear face 112 of the completed and sealed envelope 102 preferably between the top of the address window 136 and the printed fold line 124 as shown. The magnetic strip may take any desired shape, for example, starburst, flower, square or the like. The magnetic strip 125 allows the reminder display envelope 10 to be mounted on a vertical ferrous surface, such as a refrigerator door, without setting up the upstanding display 107 of, for example, FIGS. 7, 8, 15 and 16. The magnetic strip 125 can also store information as magnetic data as a credit card does. This information can be used by the mailer, the postal service, or others.

Figure 13:
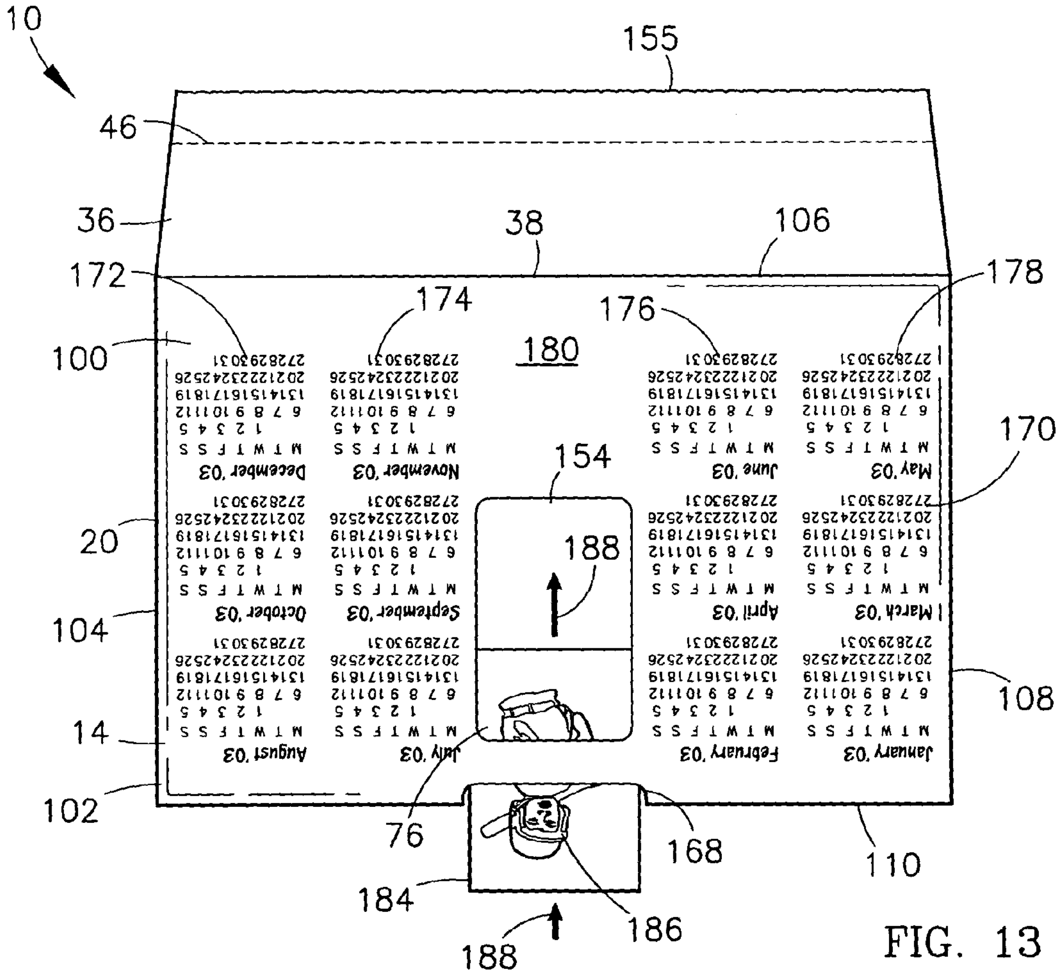
FIG. 13 is a front view of the reminder display envelope of FIG. 9 illustrating the insertion of a display card into the display window.

Referring to FIG. 13, a display card 184 can be inserted into the reminder pocket 76, where it is visible through the display window 154, through the access slot 168 in the direction of the arrows 188. The jagged top edge 155 of the seal flap 36 remains after the perforated pull tab zipper 150 has been removed to open the reminder display envelope 10 and this edge will become the upper edge 157 (FIG. 16) of the upstanding flange 122 while the portion of the seal flap 36 above the perforated pull tab zipper 150 remains attached to the rear surface 20 of the reminder display envelope 10.

Figure 14:
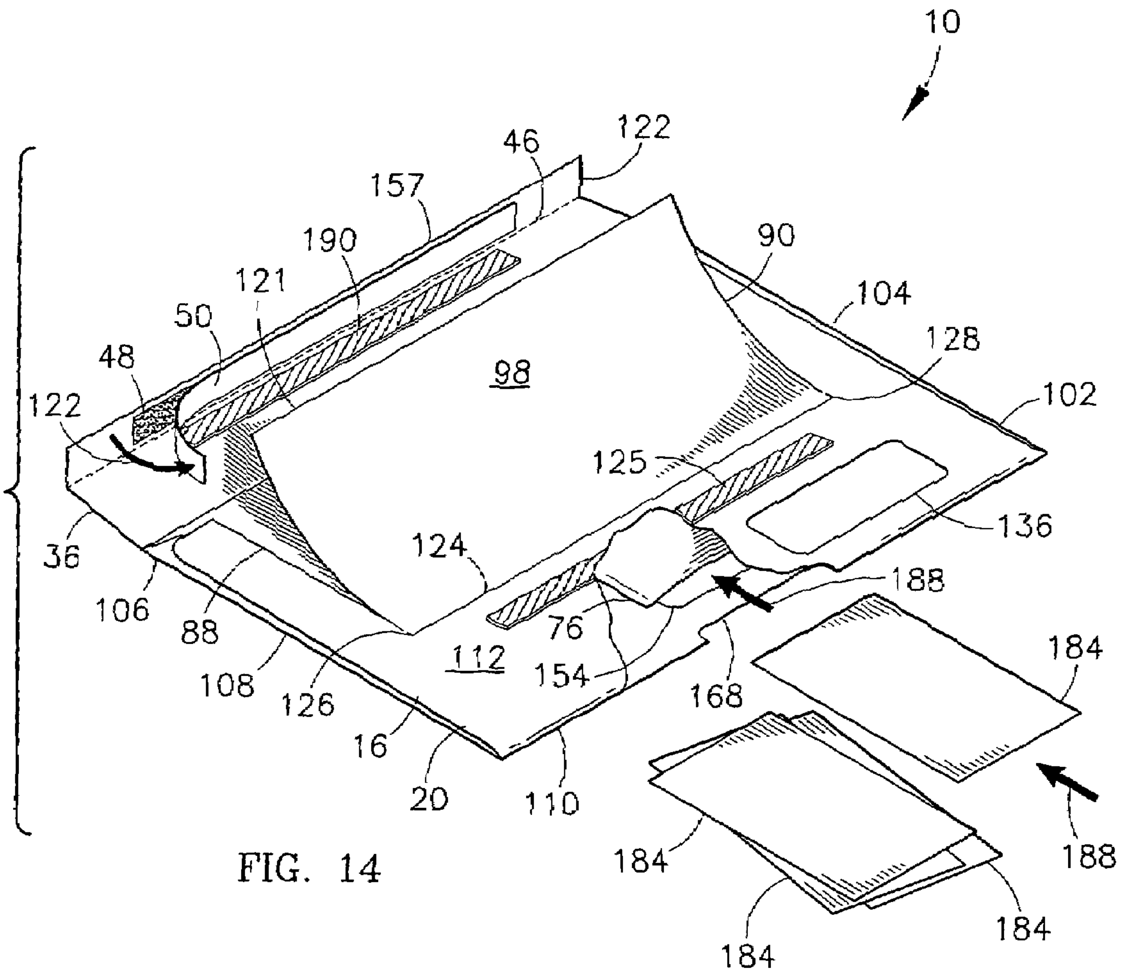
FIG. 14 is an isometric view, partially cut away, of the rear face of the reminder display envelope of FIG. 9 illustrating the assembly of the reminder display envelope into an upstanding display and the insertion of reminder cards into the reminder display pocket.

Referring to FIG. 14, a number of display cards 184, preferably each having a different image or message, can be stacked together and inserted into the reminder pocket 76 together, with of course, only the upper display card 184 being displayed. A plurality of display cards 184 can be inserted into the reminder pocket 76 either by the shipper or by the recipient. The recipient can then conveniently change the particular display card 184 that is actually displayed through the display window 154 by shuffling through the reminder cards 184 and selecting one. The reminder cards 184 can also be stored in the reminder pocket 76 in a particular predetermined order. The reminder display envelope 10 is erected into the upstanding display 107 in the same manner described above in connection with FIGS. 6–8.

Figure 15:
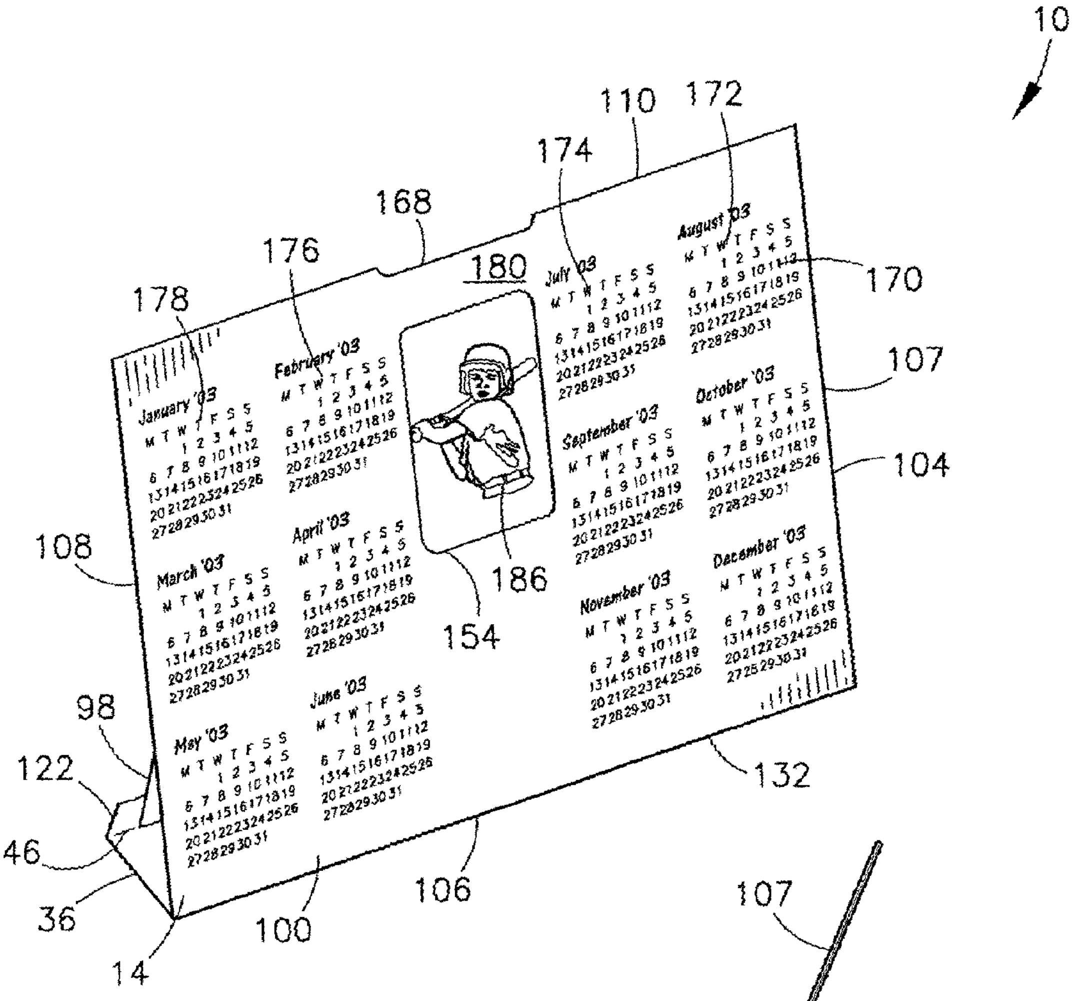
FIG. 15 is a an isometric view of the front face of the reminder display envelope of FIG. 9 illustrating the completed upstanding display.
Figure 16:
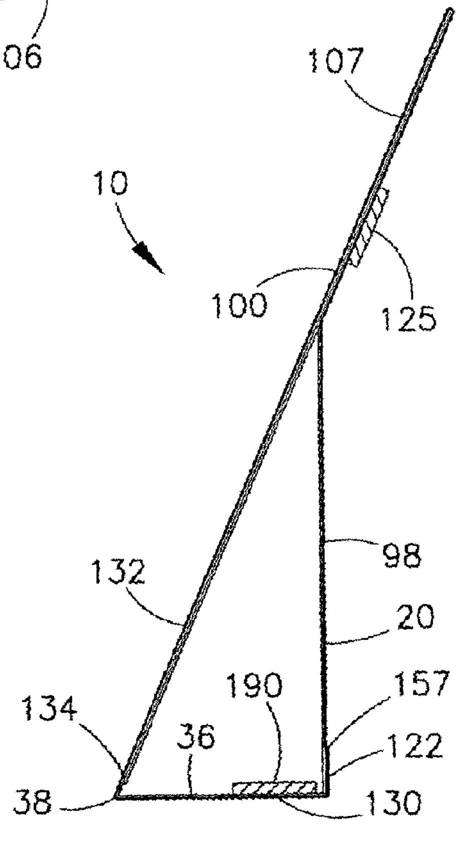
FIG. 16 is a side view of the upstanding display of FIG. 15.

Referring to FIGS. 15, 16, the completed upstanding display 107 presents the recipient with a display showing a calendar 170 or the like and a favored display card 184 in a display suitable for standing on any horizontal surface.

Referring to FIG. 16, a strip of magnet material 190 is glued along the seal flap 36 adjacent to (and below as shown in FIG. 9) the secondary score line 46 for providing additional stability and holding power on ferric surfaces. The magnet material 190 may be replaced by any type of weight, including for example, a thin metal strip, a folded over bangtail envelope flap extension or the like and, like the magnetic strip 125, may be used to store magnetically recorded information. The reminder display envelope may include both a magnetic strip 125 and 190, or either alone, as needed. A magnetic strip, or other weight, can be secured to the reminder display envelope 10 at any convenient location.

While the present invention has been described in accordance with the preferred embodiments thereof, the description is for illustration only and should not be construed as limiting the scope of the invention. Various changes and modifications may be made by those skilled in the art without departing from the spirit and scope of the invention as defined by the following claims.

I claim:

1. A reminder display envelope comprising:

a. an envelope having a front face and a rear face; and b. means for reminding a recipient of a date or event;

c. means for readily removing said reminder means from said envelope; and d. a reminder pocket comprising a transparent window having a bottom edge, a left-hand edge and a right-hand edge, each secured to a front face of a flat pattern blank of said envelope by an adhesive strip applied along said bottom edge, said left-hand edge and said right-hand edge of said transparent window of said envelope and a top edge not secured to said flat pattern blank whereby a separate member can be inserted into said reminder pocket.

2. A reminder display envelope in accordance with claim 1 wherein said reminder means further comprises a reminder notice message printed upside down relative to a mailing orientation of said reminder display envelope onto a surface of a flat pattern blank that forms a rear exterior surface of said assembled reminder display envelope.

3. A reminder display euvelope in accordance with claim 2 wherein said reminder means further comprises at least one reminder card defined by a top perforation line, a bottom perforation line and a pair of spaced parallel perforation lines, each connected to each of said top and bottom perforation lines with said bottom perforation line lying along a bottom edge of said reminder display envelope.

4. A reminder display envelope in accordance with claim 1 wherein said reminder pocket further comprises a combination transparent mailing address window and reminder pocket on said envelope for revealing the mailing address of the initial recipient.

5. A reminder display envelope in accordance with claim 1 wherein said reminder means further comprises a display supporting panel comprising a left-hand side perforation line and a parallel right-hand perforation line, both extending upwardly from a bottom edge of a flat pattern blank for forming said envelope to a point 40%–70% of the distance from said bottom edge of said flat pattern blank to a panel separation score line of said flat pattern blank and a printed fold line connecting an upper end of a left-hand side perforation line and an upper end of a right-hand side perforation line of said display supporting panel providing a visual assembly guide for a user erecting said display supporting panel.

6. A reminder display envelope in accordance with claim 5 wherein said reminder means further comprises an adhesive coated flange on an upper portion of a sealing flap of said envelope folded into an upstanding flange and adhered to an exterior surface of a lower edge of said display supporting panel, forming a flat base wholly in contact with a supporting surface from a portion of said sealing flap and a reminder display panel supported at an inclined angle by said flat base and said display supporting panel.

7. A reminder display envelope in accordance with claim 1 further comprising an ungummed window margin on said flat pattern blank between a top edge of an address window, a left-hand edge of said address window, and a right-hand edge of said address window and said adhesive, whereby said reminder pocket includes a margin of along said sides for retaining said reminder means.

8. A reminder display envelope comprising a. an envelope having a front face and a rear face; and b. a reminder card comprising a reminder notice message printed on an exterior surface of said envelope within an area defined by a top perforation line, a bottom perforation line and a pair of spaced parallel perforation lines, each connected to each of said top and bottom perforation lines; and c. means for erecting said envelope into an upstanding reminder display, said erecting means further comprising a pair of parallel lines of perforations on a rear face of said envelope, said lines of perforations running from a bottom edge of said rear face to a printed fold line on said rear face of said envelope forming a display supporting panel and a strip of adhesive along an inner surface of a seal flap of said envelope and a release strip covering said adhesive strip with said adhesive strip securing a lower edge of said display supporting panel, with said reminder display further comprising a transparent reminder pocket and combined address window having an unsealed open top edge, with said reminder pocket and combined address window being located on said front face of said envelope for receiving said reminder means.

9. A reminder display envelope in accordance with claim 8 wherein said transparent reminder pocket further comprises a transparent reminder window sheet having a left-hand edge, a right-hand edge and a bottom edge adhered to said reminder display envelope.

10. A reminder display envelope comprising:

a. an envelope having a front face and a rear face; and b. a reminder card comprising a reminder notice message printed upside down on an exterior rear surface of said envelope within an area on said envelope defined by a top perforation line, a bottom perforation line lying adjacent to a bottom flap score line of said envelope and a pair of spaced parallel perforation lines, each connected to each of said top and bottom perforation lines; and c. a display supporting panel comprising a pair of spaced parallel perforation lines extending downwardly from a top edge of the completed and sealed envelope to a point in the range of 40%–70% of the distance from said top edge of the completed and sealed envelope of said flat pattern blank to a panel separation score line of said flat pattern blank, a printed fold line connecting a lower end of both of said spaced parallel perforation lines and a flange on an upper portion of a sealing flap of said envelope, said flange coated with a layer of adhesive and covered by a release strip, said flange being adhered to an exterior surface of an upper edge of said display supporting panel, forming a flat base wholly contacting a flat horizontal supporting surface for enhanced stability when said envelope is inverted such that the bottom edge of said envelope becomes the top edge of said envelope, said flat base being formed from a portion of said sealing flap and a reminder display panel supported at an inclined angle by said flat base and said display supporting panel.

11. A reminder display envelope in accordance with claim 10 wherein said reminder card is formed in a centered lower portion of said rear face of said envelope with said top perforation line and a lower portion of said spaced parallel perforation lines lying on said rear face of said envelope and a lower edge of said reminder card lying adjacent to and parallel to said bottom flap score line.

* * * * *